(12) United States Patent
McGuffin et al.

(10) Patent No.: US 9,998,360 B2
(45) Date of Patent: *Jun. 12, 2018

(54) MINIMIZINING MESSAGE PROPAGATION TIMES WHEN BRIEF DATALINK INTERRUPTIONS OCCUR

(71) Applicant: Honeywell International Inc., Morristown, NJ (US)

(72) Inventors: Thomas F. McGuffin, Bellevue, WA (US); Thomas D. Judd, Woodinville, WA (US)

(73) Assignee: Honeywell International Inc., Morris Plains, NJ (US)

( * ) Notice: Subject to any disclaimer, the term of this patent is extended or adjusted under 35 U.S.C. 154(b) by 153 days.

This patent is subject to a terminal disclaimer.

(21) Appl. No.: 14/543,466

(22) Filed: Nov. 17, 2014

(65) Prior Publication Data

US 2016/0142288 A1    May 19, 2016

(51) Int. Cl.
*H04L 12/703* (2013.01)
*H04L 29/06* (2006.01)
(Continued)

(52) U.S. Cl.
CPC ........... *H04L 45/28* (2013.01); *G08G 5/0013* (2013.01); *H04B 7/18506* (2013.01);
(Continued)

(58) Field of Classification Search
CPC ..... H04L 1/00; H04L 1/08; H04L 1/18; H04L 1/1819; H04L 1/1822; H04L 1/1825;
(Continued)

(56) References Cited

U.S. PATENT DOCUMENTS

| 4,031,317 A | 6/1977 | McClain et al. |
| 4,726,027 A * | 2/1988 | Nakamura ......... H04B 7/18582 714/748 |

(Continued)

FOREIGN PATENT DOCUMENTS

| EP | 1848139 | 10/2007 |
| EP | 2012493 | 1/2009 |

(Continued)

OTHER PUBLICATIONS

European Patent Office, "Extended European Search Report for EP Application No. 15193971.7", from Foreign Counterpart to U.S. Appl. No. 14/543,466, dated May 3, 2016, pp. 1-6, Published in: EP.

(Continued)

*Primary Examiner* — Eric Nowlin
(74) *Attorney, Agent, or Firm* — Fogg & Powers LLC

(57) ABSTRACT

A method for minimizing datalink message propagation time comprises determining whether a datalink TPDU ready for transmission requires an acknowledgement; transmitting the TPDU, starting a transport retry timer, and setting a transmission count to one, when acknowledgement is required; determining whether acknowledgement is received after transmitting the TPDU; determining whether the retry timer has expired if acknowledgement not received; determining whether a hold mode is in effect when the retry timer has expired; determining whether a transport inactivity timer has expired when the hold mode is in effect; determining whether the hold mode is still in effect when the inactivity timer has not expired; when the hold mode is no longer in effect, incrementing the transmission count by one; and retransmitting the datalink TPDU and restarting the retry timer, when the transmission count is less than a predetermined maximum value and the inactivity timer has not expired.

15 Claims, 4 Drawing Sheets

(51) Int. Cl.
*H04L 1/18* (2006.01)
*H04B 7/185* (2006.01)
*G08G 5/00* (2006.01)

(52) U.S. Cl.
CPC .............. *H04L 1/188* (2013.01); *H04L 69/16* (2013.01); *H04L 69/28* (2013.01)

(58) Field of Classification Search
CPC ....... H04L 1/1864; H04L 1/188; H04L 1/189; H04L 1/1896; H04L 69/16; H04L 69/28; G08G 5/0013; H04B 7/18506
See application file for complete search history.

(56) References Cited

U.S. PATENT DOCUMENTS

| | | | |
|---|---|---|---|
| 5,297,143 A | 3/1994 | Fridrich et al. | |
| 5,453,987 A * | 9/1995 | Tran | H04L 12/413 370/203 |
| 6,076,181 A | 6/2000 | Cheng | |
| 6,434,147 B1 | 8/2002 | Brown et al. | |
| 6,438,105 B1 | 8/2002 | Qarni et al. | |
| 6,519,223 B1 * | 2/2003 | Wager | H04L 1/1809 370/216 |
| 6,530,056 B1 * | 3/2003 | Boxall | H04L 1/0001 370/468 |
| 6,574,770 B1 | 6/2003 | Daudelin | |
| 6,590,905 B1 | 7/2003 | Suumaki et al. | |
| 6,611,495 B1 | 8/2003 | Meyer et al. | |
| 6,697,331 B1 * | 2/2004 | Riihinen | H04L 1/1614 370/236 |
| 6,757,245 B1 * | 6/2004 | Kuusinen | H04W 28/18 370/230 |
| 6,778,551 B1 | 8/2004 | Oh | |
| 6,928,289 B1 * | 8/2005 | Cho | H04W 60/00 370/310.2 |
| 7,031,273 B2 | 4/2006 | Shores et al. | |
| 7,366,096 B2 | 4/2008 | Swami | |
| 7,733,826 B2 * | 6/2010 | Jiang | H04L 69/28 370/328 |
| 7,835,277 B2 * | 11/2010 | Kim | H04W 72/1242 370/230 |
| 7,839,858 B2 * | 11/2010 | Wiemann | H04L 1/0002 370/394 |
| 8,094,557 B2 | 1/2012 | Messing et al. | |
| 8,126,012 B2 * | 2/2012 | Mishima | H04N 21/4305 370/394 |
| 8,179,894 B2 * | 5/2012 | Tu | H04L 12/5695 370/392 |
| 8,225,093 B2 * | 7/2012 | Fok | H04L 63/0869 713/168 |
| 8,284,043 B2 | 10/2012 | Judd et al. | |
| 8,483,095 B2 * | 7/2013 | Hegde | H04L 69/162 370/255 |
| 8,553,698 B2 * | 10/2013 | Wiemann | H04L 1/0002 370/394 |
| 8,593,954 B2 | 11/2013 | Zhuang | |
| 9,155,111 B2 * | 10/2015 | Wang | |
| 9,225,616 B2 * | 12/2015 | Vasseur | H04L 41/5025 |
| 9,590,771 B2 * | 3/2017 | Koskinen | H04L 1/1838 |
| 9,866,488 B2 * | 1/2018 | Kim | H04L 47/18 |
| 2002/0069388 A1 | 6/2002 | Niu et al. | |
| 2002/0118667 A1 | 8/2002 | Chintada et al. | |
| 2002/0183900 A1 * | 12/2002 | Sainthuile | G08G 5/0008 701/4 |
| 2003/0081553 A1 | 5/2003 | Bitar | |
| 2003/0109973 A1 * | 6/2003 | Hensey | H04L 63/0853 701/32.6 |
| 2003/0152030 A1 | 8/2003 | Hershey | |
| 2003/0181214 A1 * | 9/2003 | Grob | H04L 1/1809 455/515 |
| 2004/0218532 A1 | 11/2004 | Khirman | |
| 2005/0117576 A1 * | 6/2005 | McDysan | H04L 45/308 370/389 |
| 2005/0265279 A1 | 12/2005 | Markovic et al. | |
| 2005/0281215 A1 * | 12/2005 | Budampati | H04L 1/1887 370/328 |
| 2006/0080451 A1 * | 4/2006 | Eckert | G06F 9/544 709/230 |
| 2006/0133554 A1 | 6/2006 | Horn | |
| 2006/0187823 A1 | 8/2006 | Haag et al. | |
| 2006/0285527 A1 | 12/2006 | Gao et al. | |
| 2006/0285528 A1 | 12/2006 | Gao et al. | |
| 2006/0291395 A1 | 12/2006 | Ketonen et al. | |
| 2007/0076639 A1 | 4/2007 | Chou | |
| 2007/0258400 A1 * | 11/2007 | Jiang | H04L 1/1883 370/328 |
| 2007/0300120 A1 * | 12/2007 | Kim | H04L 1/1851 714/749 |
| 2008/0130670 A1 * | 6/2008 | Kim | H04W 72/1242 370/412 |
| 2008/0198869 A1 | 8/2008 | Jiang | |
| 2008/0215883 A1 * | 9/2008 | Fok | H04L 63/0869 713/167 |
| 2008/0225703 A1 | 9/2008 | Rider et al. | |
| 2008/0232284 A1 | 9/2008 | Dalsgaard et al. | |
| 2008/0279171 A1 | 11/2008 | Kim et al. | |
| 2008/0291911 A1 | 11/2008 | Lee et al. | |
| 2008/0317017 A1 * | 12/2008 | Wiemann | H04L 1/0002 370/389 |
| 2009/0077626 A1 * | 3/2009 | Leclercq | H04B 7/18506 726/1 |
| 2009/0168920 A1 | 7/2009 | Chen | |
| 2009/0268707 A1 * | 10/2009 | Pani | H04L 1/18 370/345 |
| 2010/0008278 A1 | 1/2010 | Kone et al. | |
| 2010/0014419 A1 * | 1/2010 | Lee | H04W 80/06 370/225 |
| 2010/0153804 A1 | 6/2010 | Cai et al. | |
| 2010/0188266 A1 * | 7/2010 | Judd | G08G 5/0013 340/945 |
| 2010/0246513 A1 * | 9/2010 | Lindskog | H04L 1/1825 370/329 |
| 2010/0272104 A1 | 10/2010 | Le et al. | |
| 2010/0277292 A1 * | 11/2010 | McGuffin | H04L 69/28 340/309.9 |
| 2010/0277347 A1 * | 11/2010 | Judd | G08G 5/0021 340/945 |
| 2011/0019756 A1 | 1/2011 | Chun et al. | |
| 2011/0026625 A1 | 2/2011 | Susitaival et al. | |
| 2011/0038376 A1 * | 2/2011 | Wiemann | H04L 1/0002 370/394 |
| 2011/0090795 A1 * | 4/2011 | Li | H04L 43/0829 370/235 |
| 2011/0116427 A1 | 5/2011 | Chang et al. | |
| 2011/0210870 A1 * | 9/2011 | McGuffin | G08G 5/0013 340/945 |
| 2012/0099502 A1 | 4/2012 | Park et al. | |
| 2013/0083677 A1 | 4/2013 | Kim et al. | |
| 2013/0194933 A1 | 8/2013 | Celik et al. | |
| 2013/0308546 A1 * | 11/2013 | Naraha | H04W 48/08 370/328 |
| 2014/0029432 A1 * | 1/2014 | Vasseur | H04L 41/5025 370/236 |
| 2014/0153574 A1 | 6/2014 | Louzoun et al. | |
| 2014/0310405 A1 | 10/2014 | Pope et al. | |
| 2015/0023167 A1 | 1/2015 | Tong | |
| 2015/0055482 A1 * | 2/2015 | Larson | H04L 1/08 370/242 |
| 2015/0163149 A1 | 6/2015 | Norlander et al. | |
| 2015/0212701 A1 * | 7/2015 | Rodney | G06F 3/04842 715/771 |
| 2015/0304071 A1 * | 10/2015 | Koskinen | H04L 1/1838 370/331 |
| 2016/0142129 A1 | 5/2016 | Judd et al. | |
| 2017/0134992 A1 * | 5/2017 | Koskinen | H04W 36/0016 |

(56) References Cited

U.S. PATENT DOCUMENTS

2017/0142015 A1* 5/2017 Kim ..................... H04L 47/18
2017/0332318 A1* 11/2017 Vyas .................... H04W 48/20

FOREIGN PATENT DOCUMENTS

| EP | 2211323 | 7/2010 |
|---|---|---|
| EP | 2363847 | 7/2011 |
| WO | 9851052 | 11/1998 |
| WO | 2004047357 | 6/2004 |
| WO | 2004068801 | 8/2004 |
| WO | 2006007870 | 1/2006 |

OTHER PUBLICATIONS

Goossens, "Minimal solution for Congestion Management", "Aeronautical Telecommunications Network Panel Working Group Two", Jul. 6, 1995, pp. 6.

Mbarushimana et al., "Resource Efficient TCP: Reducing Contention-Induced Spurious Timeouts in QoS-Aware MANETs", "22nd International Conference on Advanced Information Networking and Applications", Mar. 25-28, 2008, pp. 1070-1077, Publisher: IEEE Computer Society, Published in: GB.

Tamalet, "TP4 timeout and retransmission issues", "Aeronautical Telecommunications Network Panel", May 1999, pp. 1-9, Published in: IT.

European Patent Office, "Extended European Search Report for EP Application No. 15193767.9", from Foreign Counterpart to U.S. Appl. No. 14/543,474, dated Apr. 6, 2016, pp. 1-10, Published in: EP.

European Patent Office, "Communication pursuant to Article 94(3) EPC from EP Application No. 15193971.7 dated Sep. 6, 2016", from Foreign Counterpart of U.S. Appl. No. 14/543,466, filed Sep. 6, 2016, pp. 1-4, Published in: EP.

U.S. Patent and Trademark Office, Ex Parte Quayle Office Action, U.S. Appl. No. 14/543,474, dated Sep. 14, 2016, pp. 1-27, Published in: US.

European Patent Office, "Communication pursuant to Article 94(3) EPC, from EP Application No. 15193971.7, dated Jan. 20, 2017", from Foreign Counterpart of U.S. Appl. No. 14/543,466, filed Jan. 20, 2017, pp. 1-5, Published in: EP.

U.S. Patent and Trademark Office, "Notice of Allowance", U.S. Appl. No. 14/543,474, dated Jan. 27, 2017.

* cited by examiner

MINIMIZINING MESSAGE PROPAGATION TIMES WHEN BRIEF DATALINK INTERRUPTIONS OCCUR

BACKGROUND

Air Traffic Control (ATC) is now supplementing voice communication with datalink communications between air traffic controllers and pilots. The datalink communication system is specified worldwide by standards from the International Civil Aviation Organization (ICAO). The datalink communication system uses a communication protocol suite called Aeronautical Telecommunication Network (ATN), which is based on the standard seven layer Open Systems Interconnection (OSI) protocols.

One layer of the ATN is the transport (TPS) layer, which contains a retry timer (T1) and logic to manage the retry timer. When the retry timer expires, a Transport Protocol Data Unit (TPDU), which contains a "message" or part of a "message" is transmitted again by the transport layer, the value of the retry timer is doubled, and the retry timer is started again. This continues until a TPDU acknowledging the transmitted TPDU is received or the maximum number of transmissions has occurred.

The airborne implementation of ATN is subject to brief interrupts in the datalink service. The datalink service is the actual wireless radio frequency (RF) communication between the aircraft and ground. The datalink service carries messages, such as TPDUs, from the higher layers of the ATN stack, which are designed to ignore brief datalink service interruptions and try to "coast" through the interruptions. This feature is called "hold mode."

When ATN enters a hold mode, ATN continues to operate even though the datalink layer (DLL) connection to the ground has been briefly interrupted. The TPDU does not actually get transmitted to the ground by the datalink service during the hold mode. However, the retry timer logic continues to execute and the retry timer continues to expire, with the value of the retry timer doubling each time the retry timer expires. This is due to a dynamic retransmission timer recommended by the ATN industry specifications. The algorithm for the retransmission timer is defined in ICAO 9880.

Accordingly, the current implementation of the retry timer logic can result in message delays that are much longer than ATN unavailability due to brief interruptions in the datalink service.

SUMMARY

Methods for minimizing datalink message propagation time when an interruption to datalink service occurs are provided. In one approach, a method for minimizing datalink message propagation time comprises determining whether a datalink transport protocol data unit (TPDU) ready for transmission requires an acknowledgement; transmitting the datalink TPDU, starting a transport retry timer, and setting a transmission count to one, when an acknowledgement is required; determining whether an acknowledgement is received after transmitting the datalink TPDU; determining whether the retry timer has expired if the acknowledgement has not been received; determining whether a hold mode is in effect when the retry timer has expired; determining whether a transport inactivity timer has expired when the hold mode is in effect; determining whether the hold mode is still in effect when the inactivity timer has not expired; when the hold mode is no longer in effect, incrementing the transmission count by one; and retransmitting the datalink TPDU and restarting the retry timer, when the transmission count is less than a predetermined maximum value and the inactivity timer has not expired.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
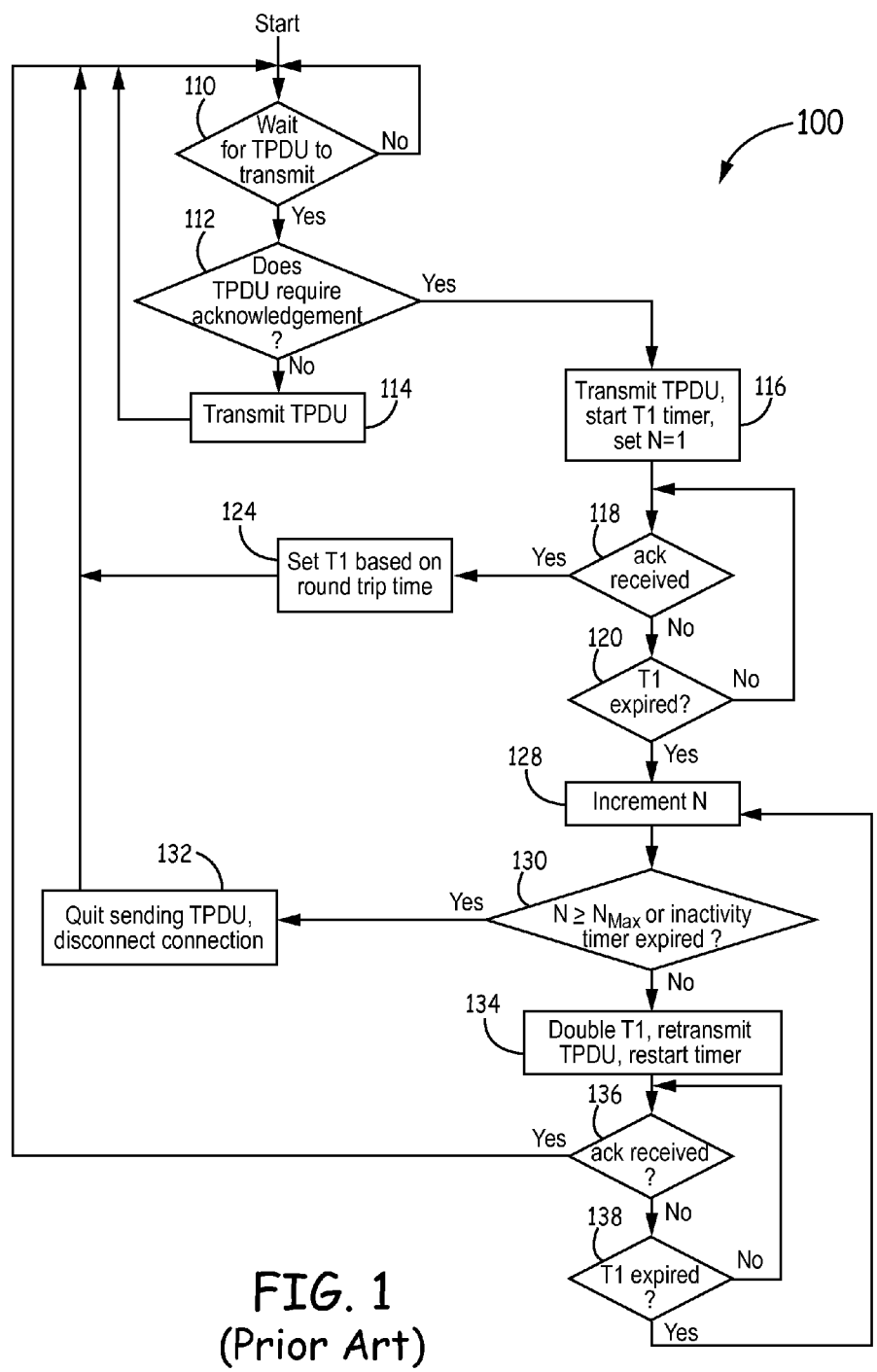
FIG. 1 is a flow diagram representing a conventional method for operation of a transport retry timer in aeronautical telecommunications.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Methods are disclosed herein for minimizing datalink message propagation times when brief interruptions to a datalink service occur. The present methods can be applied to an aeronautical transport layer, such an Aeronautical Telecommunication Network (ATN) transport layer, or a Transmission Control Protocol/Internet Protocol (TCP/IP) transport layer.

In one implementation, the present methods are applied to modify the ATN transport layer logic during a hold mode so that the value of the retry timer (T1) does not exponentially increase during the hold mode, resulting in a shorter transport protocol data unit (TPDU) propagation time. The TPDU is transmitted at the earliest possible time once a connection is available, thereby reducing propagation delay. There are several alternative modifications to the transport retry timer logic that produces the desired results.

In one approach, when the retry timer expires and the hold mode is active, the transport retry logic is "frozen" or paused until datalink connectivity is re-established, and then the hold mode is exited before a transport inactivity timer expires. Thereafter, the transport layer retransmits the TPDU and doubles the retry timer as during normal operation. The transport inactivity timer also continues as during normal operation.

In another approach, when the retry timer expires and the hold mode is active, the transport layer retransmits the TPDU and keeps the value of the retry timer the same (i.e., retry timer does not double in value as during normal operation). The transport inactivity timer also continues as during normal operation.

In a further approach, once the retry timer expires while in the hold mode, then when the hold mode is exited, the TPDU is immediately retransmitted. In an alternative approach, the retry timer is set to a minimal value while waiting to exit the hold mode. The transport inactivity timer also continues as during normal operation.

One or more of foregoing approaches can be combined together in various configurations as desired. Alternatively, these approaches can be implemented together and selectively configurable to operate as needed for optimization.

The present methods can be implemented as a revision to the ATN transport layer software in the ATN system. The ATN transport layer software is typically contained in the Communications Management Unit (CMU) or Communications Management Function (CMF) of an aircraft for downlink communications with Air Traffic Control (ATC). The ATN transport layer software can also be contained in the Flight Management Computer (FMC) or Flight Management Function (FMF) of an aircraft.

In one embodiment, the present methods can be implemented as part of the communication protocols of an ATN system onboard an aircraft. In another embodiment, the present methods can be implemented as part of the communication protocols of a TCP/IP system onboard an aircraft. The present methods can also be implemented in the ground functions of an ATC center that operate in an uplink direction.

FIG. 1 is a flow diagram representing a conventional method 100 for operation of a transport retry timer in aircraft telecommunications such as the ATN. The method 100 starts by waiting for a TPDU to transmit (block 110). When a TPDU is ready, a determination is made whether the TPDU requries an acknowledgement (block 112). If not, the TPDU is transmitted (block 114), and method 100 returns to block 110 to await another message to transmit. If an acknowledgement is required, the TPDU is transmitted, the retry timer (T1) is started, and a transmission count (N) is set to one (block 116).

A determination is then made whether an acknowledgement (ack) is received (block 118). If not, a determination is made whether the retry timer has expired (block 120). If not, method 100 repeats the steps of blocks 118 and 120 until the acknowledgement is received or the retry timer has expired. If the acknowledgement is received, the retry timer is set based on the actual round trip time (block 124), and method 100 returns to block 110 to await another TPDU to transmit.

Returning to block 120, if the retry timer has expired, the transmission count is incremented by one (block 128), and a determination is made whether the transmission count is greater than or equal to a predetermined maximum value value ($N_{max}$) (e.g., 8) or whether a transport inactivity timer has expired (block 130). If yes in either instance, method 100 quits sending the TPDU and disconnects the connection (block 132), and returns to block 110. If the transmission count is less than the predetermined maximum value, or the inactivity timer has not expired, the retry timer value is doubled, the TPDU is retransmitted, and the retry timer is restarted (block 134). A determination is then made again whether the acknowledgement is received (block 136). If yes, method 100 returns to block 110; if no, a determination is made whether the retry timer has expired (block 138). If not, method 100 repeats the steps of blocks 136 and 138 until the acknowledgement is received or the retry timer has expired. If the retry timer expires without the acknowledgement being received, method 100 returns to block 128 to increment the transmission count, and repeats the steps following block 128 until the maximum allowed transmission count is reached, the inactivity timer expires, or an acknowledgement is received.

As described previously, when ATN enters a hold mode, ATN continues to operate even though the datalink connection to the ground has been briefly interrupted. The TPDU does not get transmitted by the air/ground datalink subnetwork lower layers during the hold mode. The retry timer logic, such as described above in FIG. 1, continues to execute and the retry timer continues to expire, with the value of the retry timer doubling each time the retry timer expires. This results in message delays that are much longer than ATN unavailability due to brief interruptions in the datalink service.

Figure 2:
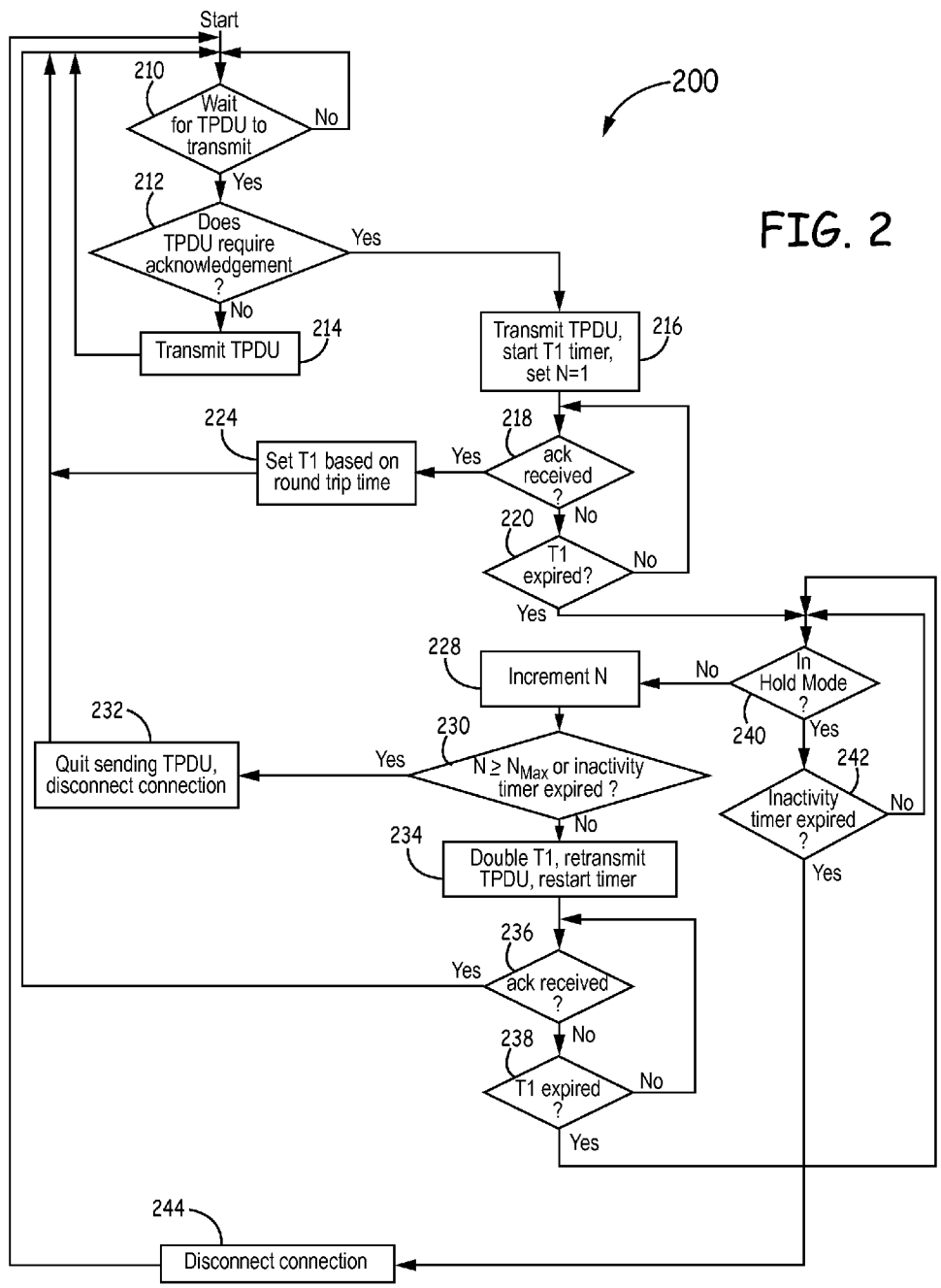
FIG. 2 is a flow diagram representing an enhanced method for operation of a transport retry timer in aeronautical telecommunications according to one approach.

FIG. 2 is a flow diagram representing a method 200 for enhanced operation of a transport retry timer in aeronautical telecommunications such as the ATN according to one approach. The method 200 minimizes message propagation times when brief interruptions to the datalink service occur during aircraft operations.

The method 200 starts by waiting for a TPDU to transmit (block 210). When a TPDU is ready, a determination is made whether the TPDU requires an acknowledgement (block 212). If not, the TPDU is transmitted (block 214), and method 200 returns to block 210 to await another TPDU to transmit. If an acknowledgement is required, the TPDU is transmitted, the retry timer (T1) is started, and a transmission count (N) is set to one (block 216).

A determination is then made whether an acknowledgement (ack) is received (block 218). If not, a determination is made whether the retry timer has expired (block 220). If not, method 200 repeats the steps of blocks 218 and 220 until the acknowledgement is received or the retry timer has expired. If the acknowledgement is received, the retry timer is set based on the actual round trip time (block 224), and method 200 returns to block 210 to await another TPDU to transmit.

Returning to block 220, if the retry timer has expired without an acknowledgement being received, then a determination is made whether a hold mode has been entered (block 240). During the hold mode, the datalink layer connection between air and ground is briefly interrupted. The TPDU does not actually get transmitted by the lower layers of the datalink service during the hold mode. If the hold mode has been entered, a determination is made whether a transport inactivity timer has expired (block 242). If not, method 200 repeats the steps of blocks 240 and 242 until the hold mode is not in effect or the inactivity timer expires. Once the inactivity timer has expired, method 200 disconnects the connection (block 244) and returns to block 210 to await a TPDU to transmit.

Returning to block 240, if the hold mode has not been entered or is no longer in effect, the transmission count is incremented by one at block 228. A determination is then made whether the transmission count is greater than or equal to a predetermined maximum value ($N_{max}$) or the inactivity timer has expired (block 230). If yes in either instance, method 200 quits sending the TPDU and disconnects the connection (block 232), and returns to block 210. If the transmission count is less than the predetermined maximum value and the inactivity timer has not expired, the retry timer value is doubled, the TPDU is retransmitted, and the retry timer is restarted (block 234). A determination is then made again whether an acknowledgement is received (block 236). If yes, method 200 returns to block 210; if no, a determination is made whether the retry timer has expired (block 238). If not, method 200 repeats the steps of blocks 236 and 238 until the acknowledgement is received or the retry timer has expired.

If the retry timer expires without the acknowledgement being received, method 200 again determines whether a hold mode has been entered at block 240. If the hold mode has been entered, a determination is again made whether the inactivity timer has expired at block 242). If not, method 200 repeats the steps of blocks 240 and 242 until the inactivity timer has expired or the hold mode has ended. If the inactivity timer has expired while in the hold mode, method 200 disconnects the connection at block 244 and returns to block 210 to await another TPDU to transmit. If the hold mode has ended at block 240, then method 200 returns to block 228 to again increment the transmission count, and repeats the steps following block 228 until the maximum transmission count is reached, the inactivity timer expires, or an acknowledgement is received.

Figure 3:
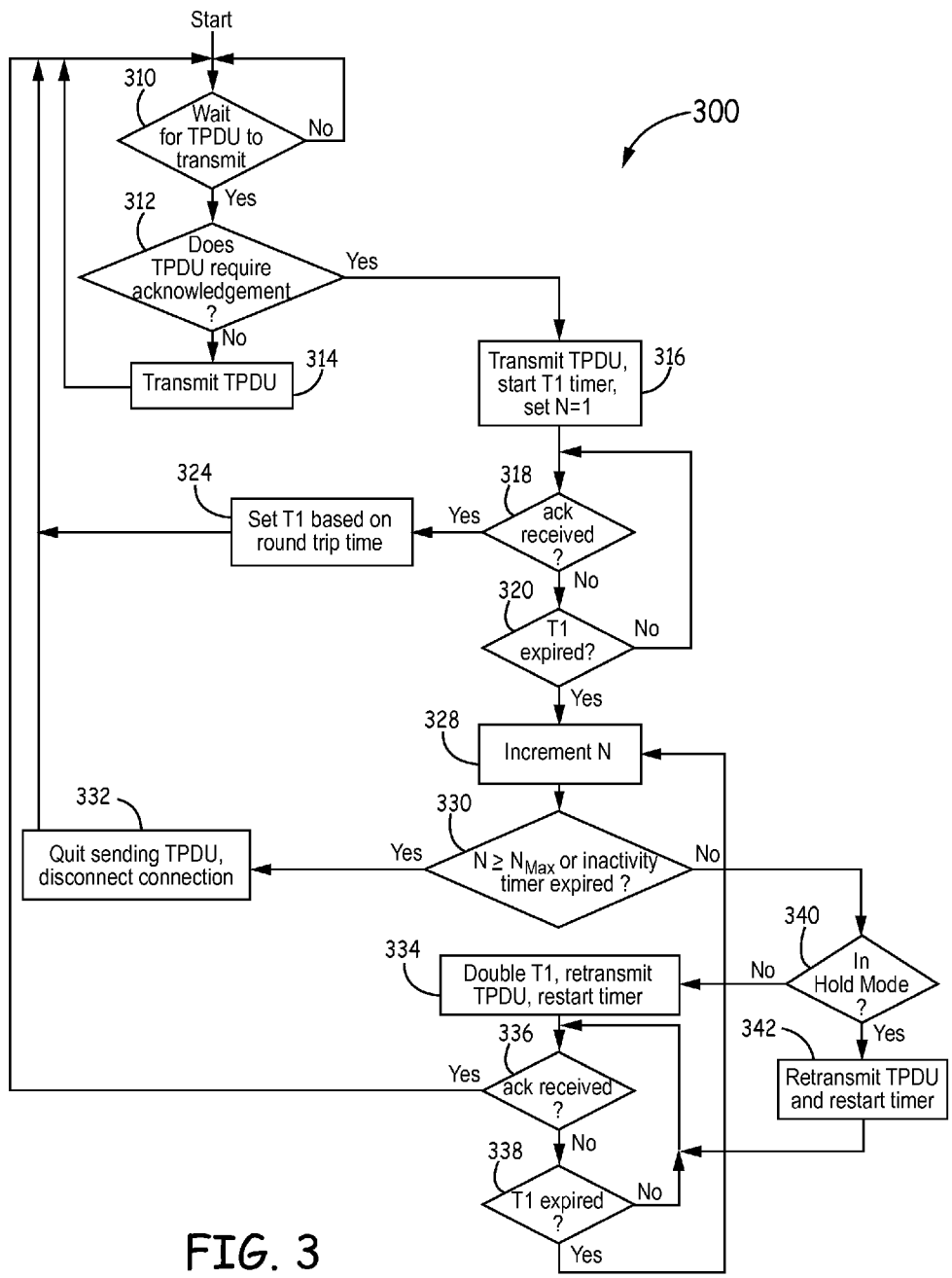
FIG. 3 is a flow diagram representing an enhanced method for operation of a transport retry timer in aeronautical telecommunications according to another approach.

FIG. 3 is a flow diagram representing a method 300 for enhanced operation of a transport retry timer in aeronautical telecommunications according to another approach, which minimizes message propagation times when brief interruptions to the datalink occur during aircraft operations.

The method 300 starts by waiting for a TPDU to transmit (block 310). When a TPDU is ready, a determination is made whether the TPDU requires an acknowledgement (block 312). If not, the TPDU is transmitted (block 314), and method 300 returns to block 310 to await another TPDU to transmit. If an acknowledgement is required, the TPDU is transmitted, the retry timer (T1) is started, and a transmission count (N) is set to one (block 316).

A determination is then made whether an acknowledgement is received (block 318). If not, a determination is made whether the retry timer has expired (block 320). If not, method 300 repeats the steps of blocks 318 and 320 until the acknowledgement is received or the retry timer has expired. When the acknowledgement is received, the retry timer is set based on the actual round trip time (block 324), and method 300 returns to block 310 to await another TPDU to transmit.

Returning to block 320, if the retry timer has expired without an acknowledgement being received, the transmission count is incremented by one (block 328). A determination is then made whether the transmission count is greater than or equal to a predetermined maximum value ($N_{max}$) or the inactivity timer has expired (block 330). If yes in either instance, method 300 quits sending the TPDU and disconnects the connection (block 332), and returns to block 310 to await another TPDU to transmit. If the transmission count is less than the predetermined maximum value and the inactiviy timer has not expired, then a determination is made whether a hold mode has been entered (block 340). If the hold mode has been entered, the TPDU is retransmitted, and the retry timer is restarted without doubling the value of the retry timer (block 342). Optionally, the retry timer value can be set to preselected minimum value. Following block 342, a determination is made whether an acknowledgement is received at block 336, and method 300 continues as described below after block 336.

Returning to block 340, if the hold mode has not been entered, the retry timer value is doubled, the TPDU is retransmitted, and the retry timer is restarted (block 334). A determination is then made whether an acknowledgement is received (block 336). If yes, method 300 returns to block 310 to await another TPDU to transmit. If the acknowledgement is not received, a determination is made whether the retry timer has expired (block 338). If not, method 300 repeats the steps of blocks 336 and 338 until the acknowledgement is received or the retry timer has expired. If the retry timer expires without the acknowledgement being received, then method 300 returns to block 328 to again increment the transmission count, and repeats the steps following block 328 until the maximum transmission count is reached, the inactivity timer expires, or an acknowledgement is received.

Figure 4:
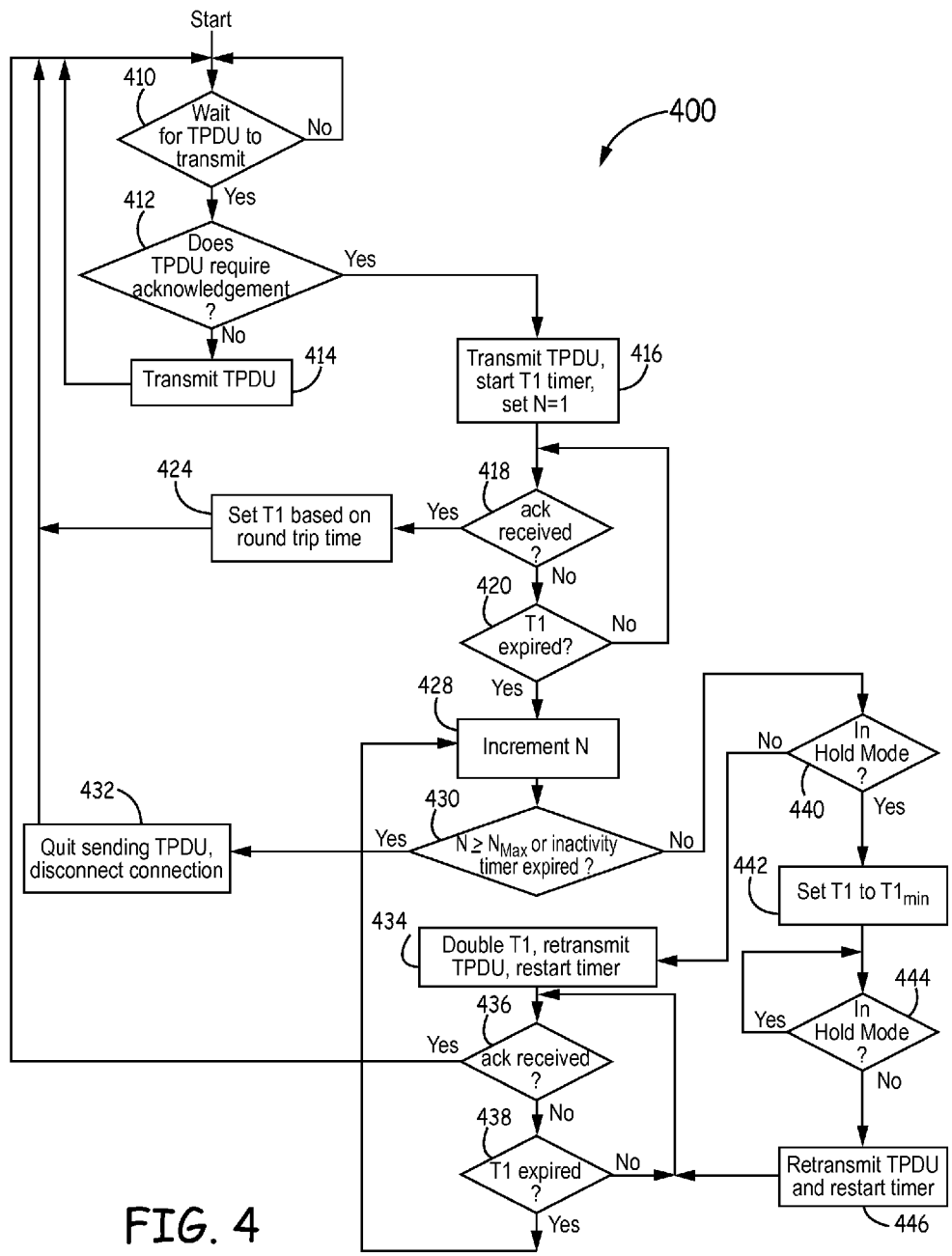
FIG. 4 is a flow diagram representing an enhanced method for operation of a transport retry timer in aeronautical telecommunications according to an alternative approach.

FIG. 4 is a flow diagram representing a method 400 for enhanced operation of a transport retry timer in aeronautical telecommunications according to a further approach, which minimizes message propagation times when brief interruptions to the datalink occur during aircraft operations.

The method 400 starts by waiting for a TPDU to transmit (block 410). When a TPDU is ready, a determination is made whether the TPDU requires an acknowledgement (block 412). If not, the TPDU is transmitted (block 414), and method 400 returns to block 410 to await another TPDU to transmit. If an acknowledgement is required, the TPDU is transmitted, the retry timer (T1) is started, and a transmission count (N) is set to one (block 416).

A determination is then made whether an acknowledgement is received (block 418). If not, a determination is made whether the retry timer has expired (block 420). If not, method 400 repeats the steps of blocks 418 and 420 until the acknowledgement is received or the retry timer has expired. When the acknowledgement is received, the retry timer is set base on the actual round trip time (block 424), and method 400 returns to block 410 to await another TPDU to transmit.

Returning to block 420, if the retry timer has expired without an acknowledgement being received, the transmission count is incremented by one (block 428). A determination is then made whether the transmission count is greater than or equal to a predetermined maximum value ($N_{max}$) or an inactivity timer has expired (block 430). If yes in either instance, method 400 quits sending the TPDU and disconnects the connection (block 432), and returns to block 410 to await another TPDU to transmit. If the transmission count is less than the predetermined maximum value and the inactivity timer has not expired, then a determination is made whether a hold mode has been entered (block 440). If yes, the retry timer can be set to a preselected minimum value ($T1_{min}$) (block 442). A further determination is then made whether the hold mode is still in effect (block 444). If yes, method 400 repeats the step of block 444 until the hold mode is no longer in effect. At that point, the TPDU is retransmitted and the retry timer is restarted (block 446).

Returning to block 440, if the hold mode has not been entered, the retry timer value is doubled, the TPDU is retransmitted, and the retry timer is restarted (block 434). A determination is then again made whether an acknowledgement is received (block 436). If yes, method 400 returns to block 410 to await another TPDU to transmit. If no acknowledgement has been received, a determination is made whether the retry timer has expired (block 438). If not, method 400 repeats the steps of blocks 436 and 438 until the acknowledgement is received or the retry timer has expired. If the retry timer expires without the acknowledgement being received, method 400 returns to block 428 where the transmission count is incremented by one, and method 400 repeats the steps thereafter.

Returning to block 446, once the TPDU is retransmitted and the retry timer is restarted, method 400 determines whether an acknowledgement is received at block 436, and method 400 continues as described above after block 436.

A computer or processor used in the present methods and systems can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present method and system.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact disks, DVDs, Blu-ray discs, or other optical storage disks; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method for minimizing datalink message propagation time when an interruption to datalink service occurs, the method comprising: (a) determining whether a datalink TPDU ready for transmission requires an acknowledgement; (b) transmitting the datalink TPDU, starting a transport retry timer, and setting a transmission count to one, when an acknowledgement is required; (c) determining whether an acknowledgement is received after transmitting the datalink TPDU; (d) determining whether the retry timer has expired if the acknowledgement has not been received; (e) determining whether a hold mode is in effect when the retry timer has expired; (f) determining whether a transport inactivity timer has expired when the hold mode is in effect; (g) determining whether the hold mode is still in effect when the inactivity timer has not expired; (h) when the hold mode is no longer in effect, incrementing the transmission count by one; and (i) retransmitting the datalink TPDU and restarting the retry timer, when the transmission count is less than a predetermined maximum value and the inactivity timer has not expired.

Example 2 includes the method of Example 1, wherein when the inactivity timer has expired while the hold mode is in effect after step (f), the method further comprising: disconnecting a transport connection; and repeating the method starting at step (a) until the acknowledgement is received, the maximum value of the transmission count is reached, or the inactivity timer expires.

Example 3 includes the method of any of Examples 1-2, further comprising: (j) doubling the retry timer value and determining whether an acknowledgement is received after retransmitting the datalink TPDU; (k) determining whether the retry timer has expired if the acknowledgement has not been received after retransmitting the datalink TPDU; (l) determining whether a hold mode is in effect when the retry timer has expired after retransmitting the datalink TPDU; (m) determining whether the inactivity timer has expired when the hold mode is in effect after retransmitting the datalink TPDU; (n) disconnecting the transport connection when the inactivity timer has expired after retransmitting the datalink TPDU; and (o) repeating the method starting at step (a) until the acknowledgement is received, the maximum value of the transmission count is reached, or the inactivity timer expires.

Example 4 includes the method of Example 3, wherein if the hold mode is not in effect when the retry timer has expired after retransmitting the datalink TPDU after step (l), the method further comprising: repeating the method starting at step (h) until the maximum value of the transmission count is reached, an acknowledgement is received, or the inactivity timer has expired.

Example 5 includes the method of any of Examples 1-4, wherein the method is implemented as part of communication protocols in an ATN system.

Example 6 includes the method of any of Examples 1-4, wherein the method is implemented as part of communication protocols in a TCP/IP system.

Example 7 includes the method of any of Examples 1-4, wherein the datalink TPDU is an aircraft downlink TPDU.

Example 8 includes the method of any of Examples 1-4, wherein the datalink TPDU is an ATC uplink TPDU.

Example 9 includes a computer comprising a processor, and a computer readable medium having instructions stored thereon, executable by the processor, to perform a method for minimizing datalink message propagation time when an interruption to datalink service occurs, according to any of Examples 1-8.

Example 10 includes a method for minimizing datalink message propagation time when an interruption to datalink service occurs, the method comprising: (a) determining whether a datalink TPDU ready for transmission requires an acknowledgement; (b) transmitting the datalink TPDU, starting a transport retry timer, and setting a transmission count to one, when an acknowledgement is required; (c) determining whether an acknowledgement is received after transmitting the datalink TPDU; (d) determining whether the retry timer has expired if the acknowledgement has not been received; (e) incrementing the transmission count by one when the retry timer has expired; (f) determining whether the transmission count is greater than or equal to a predetermined maximum value or a transport inactivity timer has expired; (g) determining whether a hold mode is in effect when the transmission count is less than the predetermined maximum value and the inactivity timer has not expired; and (h) retransmitting the datalink TPDU and restarting the retry timer when the hold mode is in effect.

Example 11 includes the method of Example 10, wherein when the hold mode is not in effect, the method further comprising doubling the retry timer value, retransmitting the datalink TPDU, and restarting the retry timer.

Example 12 includes the method of Example 11, further comprising determining whether an acknowledgement is received after retransmitting the datalink TPDU; and determining whether the retry timer has expired if the acknowledgement has not been received after retransmitting the datalink TPDU.

Example 13 includes the method of Example 12, wherein if the retry timer has expired after retransmitting the datalink TPDU, the method further comprising repeating the method starting at step (e) until the maximum value of the transmission count is reached, the inactivity timer has expired, or an acknowledgement is received.

Example 14 includes the method of Example 10, wherein the method is implemented as part of communication protocols in an ATN system.

Example 15 includes the method of Example 10, wherein the method is implemented as part of communication protocols in a TCP/IP system.

Example 16 includes a computer comprising a processor, and a computer readable medium having instructions stored thereon, executable by the processor, to perform a method for minimizing datalink message propagation time when an interruption to datalink service occurs, according to any of Examples 10-15.

Example 17 includes a method for minimizing datalink message propagation time when an interruption to datalink service occurs, the method comprising: (a) determining whether a datalink TPDU ready for transmission requires an acknowledgement; (b) transmitting the datalink TPDU, starting a transport retry timer, and setting a transmission count to one, when an acknowledgement is required; (c) determining whether an acknowledgement is received after transmitting the datalink TPDU; (d) determining whether the retry timer has expired if the acknowledgement has not been received; (e) incrementing the transmission count by one when the retry timer has expired; (f) determining whether the transmission count is greater than or equal to a predetermined maximum value or a transport inactivity timer has expired; (g) when the transmission count is less than the predetermined maximum value and the inactivity timer has not expired, determining whether a hold mode is in effect; (h) setting the retry timer to a preselected minimum value when the hold mode is in effect; (i) determining whether the hold mode is still in effect after setting the retry timer to the preselected minimum value; and (j) retransmitting the datalink TPDU and restarting the retry timer when the hold mode is no longer in effect.

Example 18 includes the method of Example 17, wherein when the hold mode is not in effect at step (g) the method further comprising doubling the retry timer value, retransmitting the datalink TPDU, and restarting the retry timer; determining whether an acknowledgement is received after retransmitting the datalink TPDU; and determining whether the retry timer has expired if the acknowledgement has not been received after retransmitting the datalink TPDU.

Example 19 includes the method of Example 18, wherein if the retry timer has expired after retransmitting the datalink TPDU, the method further comprising: repeating the method starting at step (e) until the maximum value of the transmission count is reached, the inactivity timer has expired, or an acknowledgement is received.

Example 20 includes the method of Example 17, further comprising: determining whether an acknowledgement is received after retransmitting the datalink TPDU; determining whether the retry timer has expired if the acknowledgement has not been received after retransmitting the datalink TPDU; and if the retry timer has expired after retransmitting the datalink TPDU, repeating the method starting at step (e) until the maximum value of the transmission count is reached, the inactivity timer has expired, or an acknowledgement is received.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for minimizing datalink message propagation time when an interruption to datalink service occurs, the method comprising:
    (a) determining whether a datalink transport protocol data unit (TPDU) ready for transmission requires an acknowledgement;
    (b) transmitting the datalink TPDU, starting a transport retry timer, and setting a transmission count to one, when an acknowledgement is required;
    (c) determining whether an acknowledgement is received after transmitting the datalink TPDU;
    (d) determining whether the transport retry timer has expired if the acknowledgement has not been received;
    (e) determining whether a hold mode is in effect when the transport retry timer has expired;
    (f) determining whether a transport inactivity timer has expired when the hold mode is in effect;
    (g) determining whether the hold mode is still in effect when the transport inactivity timer has not expired;
    (h) when the hold mode is no longer in effect, incrementing the transmission count by one; and
    (i) retransmitting the datalink TPDU and restarting the transport retry timer, when the transmission count is less than a predetermined maximum value and the transport inactivity timer has not expired;
    wherein the datalink TPDU comprises an aircraft downlink TPDU or an air traffic control (ATC) uplink TPDU.

2. The method of claim 1, wherein when the transport inactivity timer has expired while the hold mode is in effect after step (f), the method further comprising:
    disconnecting a transport connection; and
    repeating the method starting at step (a) until the acknowledgement is received, the predetermined maximum value of the transmission count is reached, or the transport inactivity timer expires.

3. The method of claim 1, further comprising:
    (j) doubling the transport retry timer value and determining whether an acknowledgement is received after retransmitting the datalink TPDU;
    (k) determining whether the transport retry timer has expired if the acknowledgement has not been received after retransmitting the datalink TPDU;
    (l) determining whether a hold mode is in effect when the transport retry timer has expired after retransmitting the datalink TPDU;
    (m) determining whether the transport inactivity timer has expired when the hold mode is in effect after retransmitting the datalink TPDU;
    (n) disconnecting the transport connection when the transport inactivity timer has expired after retransmitting the datalink TPDU; and
    (o) repeating the method starting at step (a) until the acknowledgement is received, the predetermined maximum value of the transmission count is reached, or the transport inactivity timer expires.

4. The method of claim 3, wherein if the hold mode is not in effect when the transport retry timer has expired after retransmitting the datalink TPDU after step (l), the method further comprising:
    repeating the method starting at step (h) until the predetermined maximum value of the transmission count is reached, an acknowledgement is received, or the transport inactivity timer has expired.

5. The method of claim 1, wherein the method is implemented as part of communication protocols in an aeronautical telecommunication network (ATN) system.

6. The method of claim 1, wherein the method is implemented as part of communication protocols in a transmission control protocol/internet protocol (TCP/IP) system.

7. A computer comprising:
a processor; and
a computer readable medium having instructions stored thereon, executable by the processor, to perform a method for minimizing datalink message propagation time when an interruption to datalink service occurs, according to claim 1.

8. A method for minimizing datalink message propagation time when an interruption to datalink service occurs, the method comprising:
  (a) determining whether a datalink transport protocol data unit (TPDU) ready for transmission requires an acknowledgement;
  (b) transmitting the datalink TPDU, starting a transport retry timer, and setting a transmission count to one, when an acknowledgement is required;
  (c) determining whether an acknowledgement is received after transmitting the datalink TPDU;
  (d) determining whether the transport retry timer has expired if the acknowledgement has not been received;
  (e) incrementing the transmission count by one when the transport retry timer has expired;
  (f) determining whether the transmission count is greater than or equal to a predetermined maximum value or a transport inactivity timer has expired;
  (g) determining whether a hold mode is in effect when the transmission count is less than the predetermined maximum value and the transport inactivity timer has not expired; and
  (h) retransmitting the datalink TPDU and restarting the transport retry timer when the hold mode is in effect;
wherein the method is implemented as part of aeronautical communication protocols, which are in an aeronautical telecommunication network (ATN) system or a transmission control protocol/internet protocol (TCP/IP) system.

9. The method of claim 8, wherein when the hold mode is not in effect, the method further comprising doubling the transport retry timer value, retransmitting the datalink TPDU, and restarting the transport retry timer.

10. The method of claim 9, further comprising:
determining whether an acknowledgement is received after retransmitting the datalink TPDU; and
determining whether the transport retry timer has expired if the acknowledgement has not been received after retransmitting the datalink TPDU.

11. The method of claim 10, wherein if the transport retry timer has expired after retransmitting the datalink TPDU, the method further comprising:
repeating the method starting at step (e) until the predetermined maximum value of the transmission count is reached, the transport inactivity timer has expired, or an acknowledgement is received.

12. A method for minimizing datalink message propagation time when an interruption to datalink service occurs, the method comprising:
  (a) determining whether a datalink transport protocol data unit (TPDU) ready for transmission requires an acknowledgement;
  (b) transmitting the datalink TPDU, starting a transport retry timer, and setting a transmission count to one, when an acknowledgement is required;
  (c) determining whether an acknowledgement is received after transmitting the datalink TPDU;
  (d) determining whether the transport retry timer has expired if the acknowledgement has not been received;
  (e) incrementing the transmission count by one when the transport retry timer has expired;
  (f) determining whether the transmission count is greater than or equal to a predetermined maximum value or a transport inactivity timer has expired;
  (g) when the transmission count is less than the predetermined maximum value and the transport inactivity timer has not expired, determining whether a hold mode is in effect;
  (h) setting the transport retry timer to a preselected minimum value when the hold mode is in effect;
  (i) determining whether the hold mode is still in effect after setting the transport retry timer to the preselected minimum value; and
  (j) retransmitting the datalink TPDU and restarting the transport retry timer when the hold mode is no longer in effect;
wherein the method is implemented as part of aeronautical communication protocols in an aeronautical transport layer.

13. The method of claim 12, wherein when the hold mode is not in effect at step (g) the method further comprising:
doubling the transport retry timer value, retransmitting the datalink TPDU, and restarting the transport retry timer;
determining whether an acknowledgement is received after retransmitting the datalink TPDU; and
determining whether the transport retry timer has expired if the acknowledgement has not been received after retransmitting the datalink TPDU.

14. The method of claim 13, wherein if the transport retry timer has expired after retransmitting the datalink TPDU, the method further comprising:
repeating the method starting at step (e) until the predetermined maximum value of the transmission count is reached, the transport inactivity timer has expired, or an acknowledgement is received.

15. The method of claim 12, further comprising:
determining whether an acknowledgement is received after retransmitting the datalink TPDU;
determining whether the transport retry timer has expired if the acknowledgement has not been received after retransmitting the datalink TPDU; and
if the transport retry timer has expired after retransmitting the datalink TPDU, repeating the method starting at step (e) until the predetermined maximum value of the transmission count is reached, the transport inactivity timer has expired, or an acknowledgement is received.

* * * * *